US008379131B2

(12) United States Patent
Minakuti et al.

(10) Patent No.: US 8,379,131 B2
(45) Date of Patent: Feb. 19, 2013

(54) IMAGE CAPTURING APPARATUS AND CONTROL METHOD THEREOF USING AMPLIFICATION RATIO BASED ON CURRENT ACCUMULATED EXPOSURE TIME

(75) Inventors: Jun Minakuti, Osaka (JP); Takahiro Koyama, Kanagawa (JP); Shinya Ishibashi, Osaka (JP); Shigeru Tsujita, Osaka (JP); Masaomi Moritsu, Osaka (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 12/566,127

(22) Filed: Sep. 24, 2009

(65) Prior Publication Data

US 2010/0073516 A1    Mar. 25, 2010

(30) Foreign Application Priority Data

Sep. 24, 2008  (JP) ................................. 2008-243980

(51) Int. Cl.
*H04N 5/222* (2006.01)
*H04N 5/228* (2006.01)
*H04N 5/235* (2006.01)

(52) U.S. Cl. .............. 348/333.04; 348/229.1; 348/222.1

(58) Field of Classification Search .............. 348/333.04
See application file for complete search history.

(56) References Cited

U.S. PATENT DOCUMENTS

| | | | | |
|---|---|---|---|---|
| 6,307,915 | B1* | 10/2001 | Frojdh | 378/98.8 |
| 7,711,254 | B2* | 5/2010 | Yamasaki | 396/55 |
| 8,036,486 | B2* | 10/2011 | Sakurai et al. | 382/274 |
| 2004/0233301 | A1* | 11/2004 | Nakata et al. | 348/239 |
| 2005/0248660 | A1* | 11/2005 | Stavely et al. | 348/208.16 |
| 2007/0285527 | A1* | 12/2007 | Kusayama et al. | 348/222.1 |

FOREIGN PATENT DOCUMENTS

| | | |
|---|---|---|
| JP | 2003-69897 | 3/2003 |
| JP | 2005-117395 | 4/2005 |

OTHER PUBLICATIONS

Office Action issued Sep. 16, 2010, in Japan Patent Application No. 2008-243980.
U.S. Appl. No. 12/536,691, filed Aug. 6, 2009, Minakuti, et al.
U.S. Appl. No. 12/763,456, filed Apr. 20, 2010, Ueda, et al.

* cited by examiner

*Primary Examiner* — Albert Cutler
(74) *Attorney, Agent, or Firm* — Oblon, Spivak, McClelland, Maier & Neustadt, L.L.P.

(57) ABSTRACT

An image capturing apparatus including: an image sensor generating an image signal; a photographing control section performing a photographing operation in which an exposure of the image sensor is divided into a plurality of exposures in accordance with a predetermined exposure time; an addition section adding sequentially the image signals obtained at each exposure; an amplification ratio calculation section calculating an amplification ratio of the added image signal on the basis of the predetermined exposure time; an amplification section amplifying the added image signal by using the amplification ratio to compensate for insufficient exposure for the predetermined exposure time; and a display control section displaying information related to the amplified image signal; wherein the photographing control section ends the photographing operation when instructed by a user, and determines that the amplified image signal is a captured image obtained by performing the photographing operation with the predetermined exposure time.

15 Claims, 7 Drawing Sheets

IMAGE CAPTURING APPARATUS AND CONTROL METHOD THEREOF USING AMPLIFICATION RATIO BASED ON CURRENT ACCUMULATED EXPOSURE TIME

BACKGROUND OF THE INVENTION

1. Field of the Invention

The present invention relates to an image capturing control technique.

2. Description of the Related Art

In a digital camera including an image sensor, image sensor sensitivity (hereinafter also called "imaging sensitivity") can be generally changed. For example, when assuming that an inherent sensitivity of the image sensor is a minimum sensitivity, a sensitivity equal to or higher than the minimum sensitivity can be realized by amplifying the output of the image sensor. More specifically, when the inherent sensitivity of the sensor is equivalent to an ISO sensitivity of 100, an ISO sensitivity of 200 can be realized by amplifying the output of the image sensor twofold, and an ISO sensitivity of 400 can be realized by amplifying the output of the image sensor fourfold.

Since the amplification of output by such a sensitivity change results in amplification of not only an image signal but also noise included in the image signal, when the imaging sensitivity is set to an ISO sensitivity of 200, the amount of noise doubles compared with a case in which the imaging sensitivity is set to an ISO sensitivity of 100.

When the imaging sensitivity is high, the output of the image sensor is amplified; therefore, the exposure time is short. On the other hand, when the imaging sensitivity is low, the exposure time is long. Therefore, when performing exposure for a relatively long time, such as when capturing an image of a night view or a celestial body, the exposure time largely varies depending on the set ISO sensitivity. For example, a subject which typically has to be exposed for one minute at an ISO sensitivity of 100 can be photographed with an exposure time of 7.5 seconds at an ISO sensitivity of 800.

As described above, since the imaging sensitivity affects exposure time and noise included in a captured image, it is preferred that, when capturing an image, the imaging sensitivity is appropriately set to shorten exposure time, while suppressing the amount of noise to an acceptable level. In other words, when capturing an image, the imaging sensitivity is preferred to be set considering the balance between the exposure time and the amount of noise.

The imaging sensitivity is set automatically in accordance with the use of ambient light or flash light, or set manually by a photographer on an experimental basis.

In a normal photographing operation, the photographing operation is completed instantly. Therefore, it is relatively easy to perform a photographing operation again if the imaging sensitivity is determined to be inappropriate after checking the captured image by using a display section such as an LCD after capturing the image. However, in a case of performing a photographing operation with a long exposure time (also called "long time exposure image capturing"), the time necessary for the photographing operation is long, so that a wait time until the captured image is checked using the display section is long. When performing a photographing operation again due to an inappropriate imaging sensitivity, more time is consumed. Therefore, it is very troublesome for a photographer who is not sure about the set imaging sensitivity to perform long time exposure image capturing.

As a technique which deals with the problems associated with long time exposure image capturing, there is a technique in which an image being photographed is displayed by a display section at any time during the exposure time, so that the image can be checked in long time exposure image capturing (for example, Japanese Unexamined Patent Application Publication No. 2003-69897). By using this technique, changes in an image being photographed which occurs as the exposure time passes can be checked. Therefore, it is possible to determine whether the exposure amount is sufficient or not during exposure.

SUMMARY OF THE INVENTION

However, the technique described in Japanese Unexamined Patent Application Publication No. 2003-69897 is a technique which enables determination of whether the exposure amount is appropriate or not during exposure in long time exposure image capturing, and the technique does not enable a photographing operation in which the amount of noise is taken into account in addition to the exposure time.

Therefore, according to an embodiment of the present invention, there is provided a technique for enabling a photographing operation in which the amount of noise is taken into account in addition to the exposure time in long time exposure image capturing.

A first apparatus according to an embodiment of the present invention is an image capturing apparatus which includes an image sensor for generating an image signal related to an subject image, photographing control means for performing a photographing operation in which an exposure of the image sensor is divided into a plurality of exposures in accordance with a predetermined exposure time, addition means for adding sequentially the image signals obtained at each exposure in the photographing operation, amplification ratio calculation means for calculating an amplification ratio of the image signal added by the addition means on the basis of the predetermined exposure time, amplification means for amplifying the image signal added by the addition means by using the amplification ratio to compensate for an exposure insufficient for the predetermined exposure time, and display control means for displaying information related to the image signal amplified by the amplification means on a display section, wherein the photographing control means ends the photographing operation when detecting an end instruction operation performed by a user, and determines that the image signal amplified by the amplification means is a captured image obtained by performing the photographing operation with the predetermined exposure time.

A second apparatus according to an embodiment of the present invention is an image capturing apparatus which includes an image sensor for generating an image signal related to an subject image, photographing control means for performing a photographing operation in which an exposure of the image sensor is divided into a plurality of exposures in accordance with a predetermined exposure time, addition means for adding sequentially the image signals obtained at each exposure in the photographing operation, amplification ratio calculation means for calculating an amplification ratio of the image signal added by the addition means on the basis of the predetermined exposure time, amplification means for amplifying the image signal added by the addition means by using the amplification ratio to compensate for an exposure insufficient for the predetermined exposure time, and noise amount calculation means for calculating the amount of noise included in the image signal amplified by the amplification means, wherein the photographing control means ends the photographing operation in accordance with the amount of noise, and determines that the image signal amplified by the amplification means is a captured image obtained by performing the photographing operation with the predetermined exposure time.

According to an embodiment of the present invention, it is possible to perform a photographing operation in which the amount of noise is taken into account in addition to the exposure time.

DESCRIPTION OF THE PREFERRED EMBODIMENTS

1. Embodiment

Hereinafter, an embodiment of the present invention will be described with reference to the drawings.

<1-1. Configuration>

Figure 1:
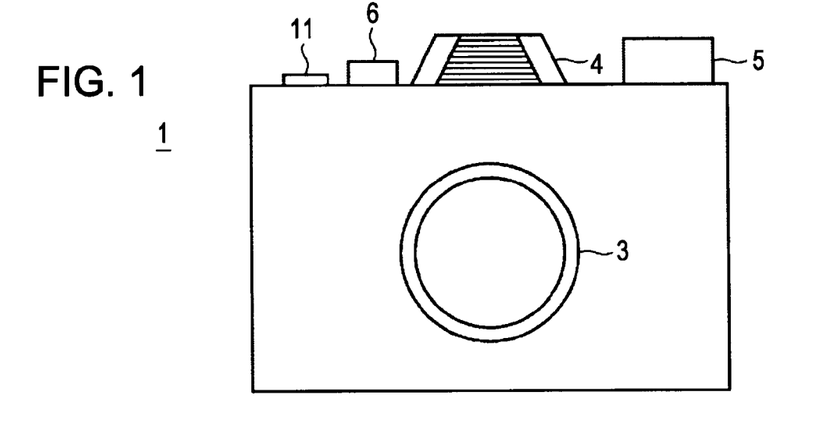
FIG. 1 is a diagram showing an external configuration of an image capturing apparatus.
Figure 2:
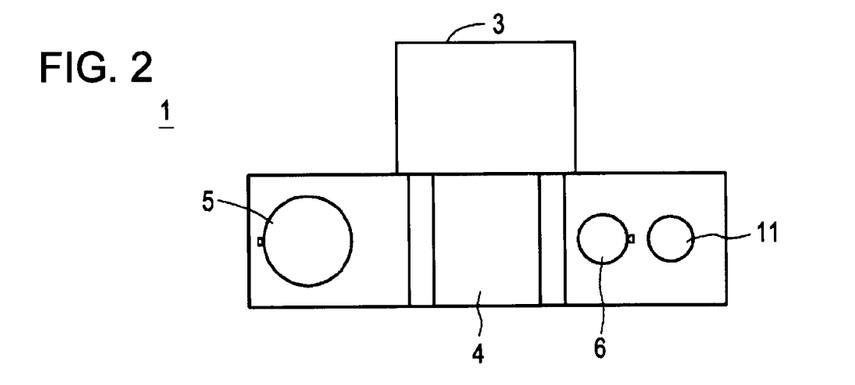
FIG. 2 is a diagram showing an external configuration of the image capturing apparatus.
Figure 3:
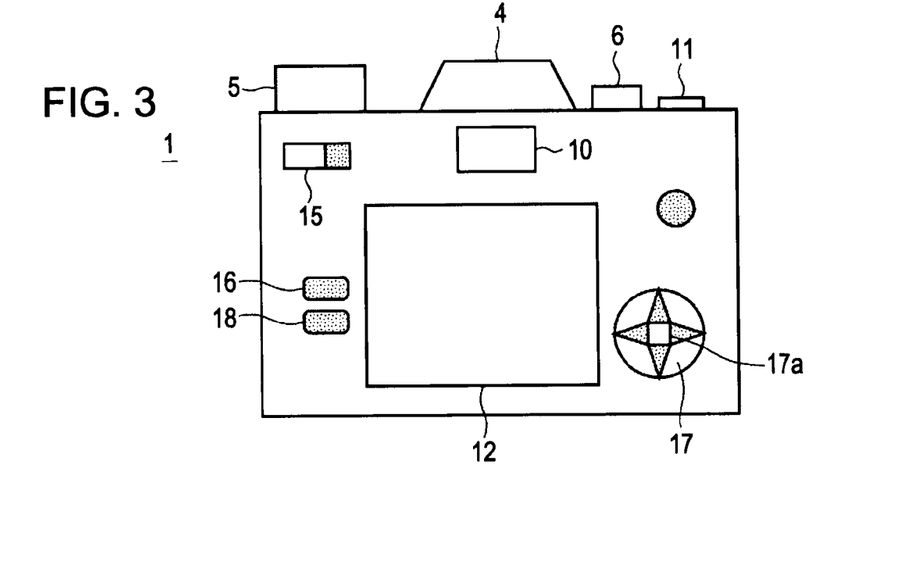
FIG. 3 is a diagram showing an external configuration of the image capturing apparatus.

FIGS. 1, 2, and 3 are diagrams showing an external configuration of an image capturing apparatus 1 according to an embodiment of the present invention. Here, FIG. 1 is a front external view of the image capturing apparatus 1, FIG. 2 is an upper external view of the image capturing apparatus 1, and FIG. 3 is a rear external view of the image capturing apparatus 1.

The image capturing apparatus 1 is configured as a digital camera, and includes a photographing lens 3 in a front surface thereof (refer to FIG. 1).

The photographing lens 3 is constituted mainly by a lens group and an aperture diaphragm. The lens group includes a focus lens for changing a focus position by being moved in an optical axis direction.

The image capturing apparatus 1 includes a release button (shutter button) 11 for instructing start of exposure, a flash 4, a mode setting dial 5, and a control value setting dial 6 on a upper surface thereof (refer to FIG. 2).

The release button 11 is a two-state detection button capable of detecting two states, a half-pressed state (S1 state) and a fully-pressed state (S2 state). When the release button 11 is pressed halfway so as to be in the S1 state, preparation operations (for example, automatic focus (AF) control operation based on a phase difference, automatic exposure (AE) control operation, and the like) for obtaining a still image (a captured image) of a subject to be recorded are performed.

When the release button 11 is further pressed so as to be in the S2 state, photographing operations of the captured image are performed (a series of operations are performed in which an exposure related to a subject image is performed using an image sensor (described later), and predetermined image processing is performed on an image signal obtained by the exposure).

The mode setting dial 5 includes a disc-shaped rotatable member. A user can select and enable a desired photographing mode by rotating the mode setting dial 5.

For example, when rotating the mode setting dial 5 to select a manual mode (M mode), the user can manually set both shutter speed and aperture value.

The control value setting dial 6 includes a disc-shaped rotatable member. The user can set a control value in each photographing mode by rotating the control value setting dial 6.

For example, in the manual mode, the user can freely change the shutter speed to adjust the exposure time by operating the control value setting dial 6. Also, in the manual mode, the user can freely change the aperture value by operating the control value setting dial 6 while pressing an aperture setting button 18 on the rear surface (refer to FIG. 3) of the image capturing apparatus 1.

The image capturing apparatus 1 includes a monitor 12, a finder window 10, a main switch (power switch) 15, a menu button 16, a direction selection key 17, and the like on the rear surface thereof.

More specifically, the monitor 12 is provided as a display section in approximately the center of the rear surface of the image capturing apparatus 1. The monitor 12 is configured as, for example, a color liquid crystal display (LCD). In the monitor 12, a menu screen for setting photographing conditions and the like can be displayed, and a captured image recorded in a recording device 105 (refer to FIG. 4) such as a memory card can be reproduced and displayed.

The finder window 10 is provided above the monitor 12. A subject image is introduced in the finder window 10, and a photographer can visually check the subject image and determine a composition by looking into the finder window 10.

The main switch 15 is provided above left of the monitor 12. The main switch 15 is constituted by a two-position slide switch. When a contact point is set in an "OFF" position, the power of the image capturing apparatus 1 is turned off, and when the contact point is set in an "ON" position, the power of the image capturing apparatus 1 is turned on.

The direction selection key (cursor key) 17 is provided to the right of the monitor 12. The direction selection key (cursor key) 17 detects four-direction pressing operations corresponding to up, down, left, and right directions. In the direction selection key 17, besides the above four-direction pressing operations, a pressing operation of a push button (decision button) 17a at the center of the key is detected.

The menu button 16 is provided to the left of the monitor 12. When the menu button 16 is pressed, a menu screen (setting screen) is displayed on the monitor 12. The user can perform setting of a specified operation of the image capturing apparatus 1 (for example, AF mode), registration of photographing condition, and the like, by performing a selection operation or a setting operation (also called simply "menu operation") by using the direction selection key 17 and the like on the menu screen.

<1-2. Function>

Figure 4:
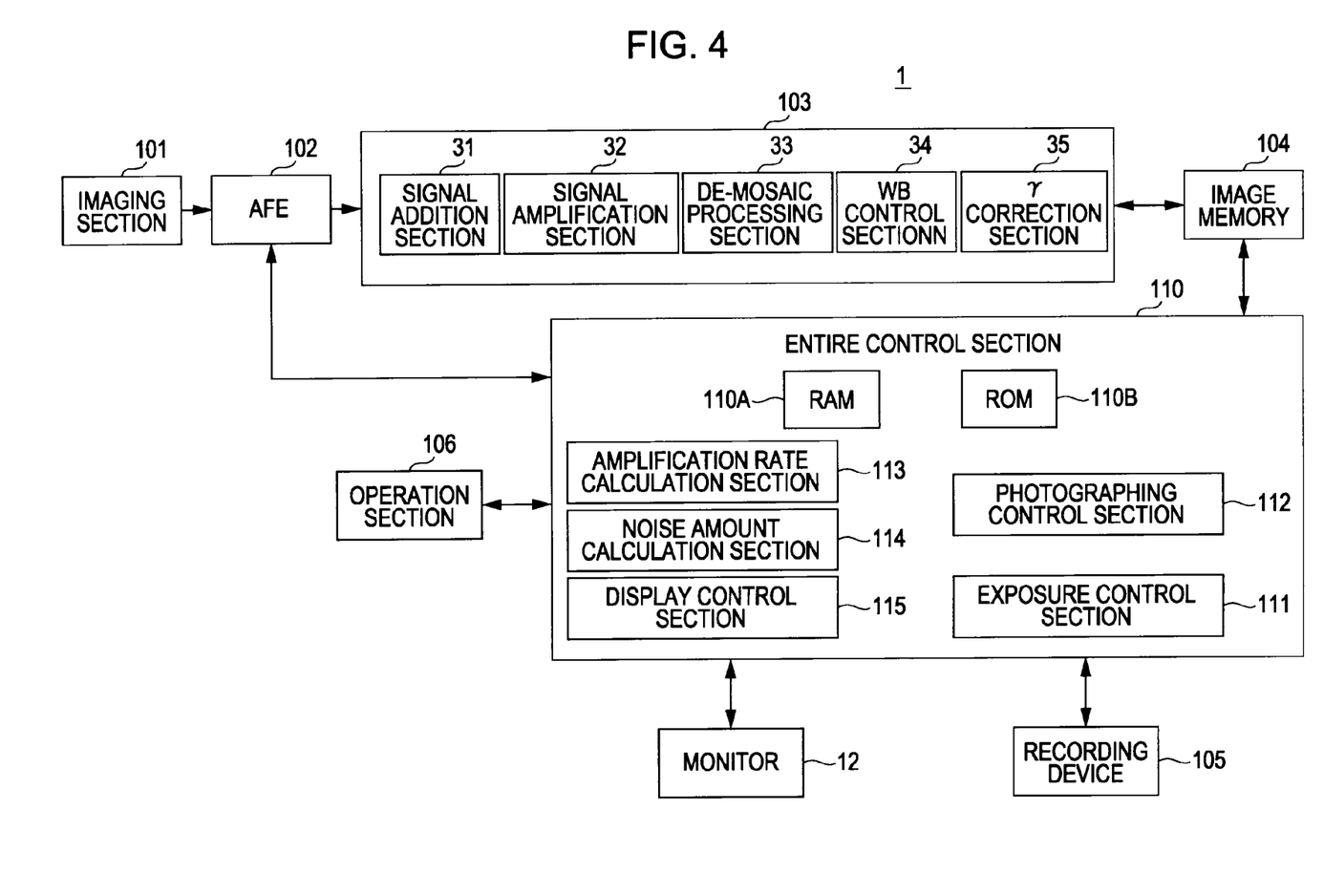
FIG. 4 is a block diagram showing a function configuration of the image capturing apparatus.
Figure 5:
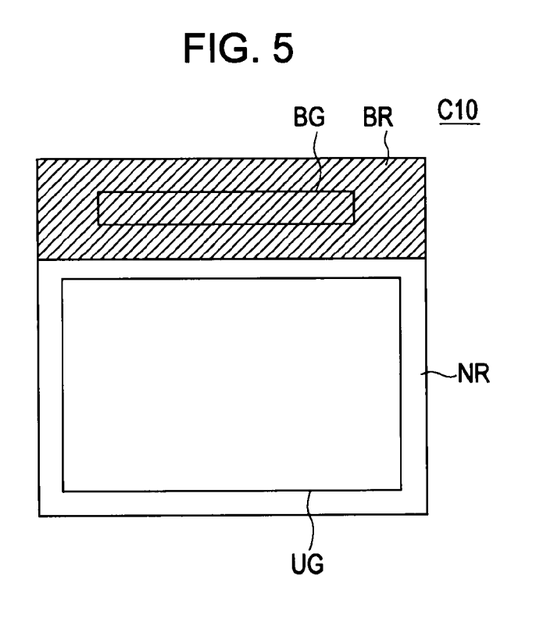
FIG. 5 is a diagram showing a light receiving surface of an image sensor.

Next, an outline of functions of the image capturing apparatus 1 will be described. FIG. 4 is a block diagram showing a function configuration of the image capturing apparatus 1. FIG. 5 is a diagram showing a light receiving surface of the image sensor C10.

As shown in FIG. 4, the image capturing apparatus 1 includes an imaging section 101, an AFE (analog front end) 102, an image processing section 103, an image memory 104, an attachable/detachable recording device 105, an operation section 106, an entire control section 110, and the like.

The operation section 106 is configured to include various buttons, switches, and the like including the release button 11, the mode setting dial 5, the control value setting dial 6 (refer to FIG. 1), and the menu button 16 (refer to FIG. 3). Responding to an input operation to the operation section 106 by the user, the entire control section 110 and the like realize various operations. For example, when the fully-pressed state of the release button 11 is detected, the photographing operation for capturing the image is executed.

The imaging section 101 is configured to include an optical sensor such as the image sensor (CCD or CMOS) C10, and obtains an image signal related to the subject image. In the image sensor C10, a plurality of pixels, which are configured to include a photodiode, are arranged two-dimensionally in horizontal and vertical directions in a matrix form. In the plurality of pixels, there are pixels UG (also called "effective pixels") included in a light unblocking area NR which can receive light forming a subject image (also called "subject light"), and pixels BG (also called "black pixels") included in an optical black (OPB) area BR which hardly receive the subject light (to which the subject light is not radiated).

For example, in the image sensor C10 shown in FIG. 5, the center portion of the image sensor C10 is set (defined) as the light unblocking area NR, and the upper portion (top edge portion) of the peripheral area of the image sensor C10 is set as the optical black area BR. Although here the top edge portion of the image sensor C10 is set as the optical black area BR, it is not limited to this, and the bottom edge portion, the left edge portion, or the right edge portion of the image sensor C10 may be set as the optical black area BR.

The effective pixels UG receive the subject light when exposed, and generate an image signal (pixel signal) related to the subject image. Specifically, primary color transmission filters of R (red), G (green), and B (Blue) are arranged checkerwise in a Bayer arrangement on the effective pixels UG, and each effective pixel converts a focused light image of the subject into an analog electric signal of a color component of R (red), G (green), or B (Blue), and generates an image signal.

On the other hand, the black pixels BG have a light blocking member for blocking the subject light on a surface of the pixels, and generate a signal of a noise component (also called "noise signal") caused by a dark current as a reference signal of the image signal.

The AFE 102 provides timing pulses for causing the image sensor C10 to perform a predetermined operation. The AFE 102 also has a function for performing predetermined signal processing on the signal outputted from each pixel to convert the signal into a digital signal (also called "digital pixel signal"), and outputting the digital signal to the image processing section 103.

The digital signal outputted to the image processing section 103 is temporarily stored in the image memory 104 in synchronization with reading of the image sensor C10. The storing of the digital signal in the image memory 104 is performed until the reading of the image sensor C10 ends (until exposure ends), and captured image data is formed in the image memory 104 after the exposure.

The image processing section 103 accesses the captured image data stored in the image memory 104 and performs a predetermined signal processing. The image processing section 103 includes a signal addition section 31, a signal amplification section 32, a de-mosaic processing section 33, a white balance (WB) control section 34, a gamma ($\gamma$) correction section 35, and the like.

The signal addition section 31 adds the image signals obtained sequentially in the imaging section 101 in long time exposure image capturing in which exposure is performed for a time longer than a basic exposure time BE.

Specifically, in long time exposure image capturing of the image capturing apparatus 1, a predetermined exposure time (also called "set exposure time") TE is divided, an exposure is performed every divided time, and image signals are obtained sequentially every divided time. In the signal addition section 31, an accumulative addition processing (also called simply "addition procession") in which the image signals obtained at each exposure are sequentially added is performed. An image signal generated by the addition processing (the image signal is also called "added image signal" or "accumulated image signal") is stored temporarily in the image memory 104 as an accumulated image data, and used again for the addition processing after the next divided exposure ends.

The signal amplification section 32 amplifies the accumulated image signal stored in the image memory at that time on the basis of an amplification ratio AP calculated in the entire control section 110, and generates an amplified image signal. Specifically, the signal amplification section 32 multiplies a pixel value, which is an accumulated image signal, of each pixel by the amplification ratio AP to amplify the image signal, and compensates for an exposure insufficient for the exposure time TE.

The de-mosaic processing section 33 obtains a color component which a pixel does not has by interpolation using color information of pixels adjacent to the pixel in the imaged data stored in the image memory 104.

The white balance control section 34 performs a level conversion (white balance (WB) adjustment) of a digital signal of each color component, R (red), G (green), B (Blue), on the basis of reference white corresponding to a light source. Specifically, white balance control section 34 identifies a portion presumed to be originally white in a subject body to be photographed from brightness data, chroma data, and the like, on the basis of WB adjustment data provided from the entire control section 110, and obtains averages of each color component R, G, and B, a G/R ratio, and a G/B ratio in the portion to perform level correction by using these ratios as correction gains of R and B.

The gamma correction section 35 corrects gradation characteristics of the image signal which has been WB-adjusted. Specifically, the gamma correction section 35 performs non-linear conversion of the image signal level for each color component and performs offset adjustment, by using a predetermined gamma correction table.

The image memory 104 is constituted by a nonvolatile memory, temporarily stores the image signal outputted from the image processing section 103 during a photographing mode, and is used as a work area where the entire processing section 110 performs a predetermined processing on the image signal. The image memory 104 temporarily stores an image signal read from the recording device 105 during a reproducing mode.

The entire control section 110 is configured to be a microcomputer, and mainly includes a CPU, a RAM 110A, and a ROM 110B. The entire control section 110 reads a program stored in the ROM 110B, and realizes various functions by the CPU executing the program. The exposure control section 111, the photographing control section 112, the amplification ratio calculation section 113, the noise amount calculation section 114, and the display control section 115 in FIG. 4 are represented as function blocks whose functions are realized by the program executed in the entire control section 110.

The exposure control section 111 performs exposure control which adjusts a shutter speed and an aperture value. Specifically, the exposure control section 111 determines an exposure value on the basis of brightness information of the subject obtained by the image sensor C10, and further sets the shutter speed and the aperture value in order to obtain an appropriate exposure on the basis of the determined exposure value. In this way, in the image capturing apparatus 1, the exposure time TE is set manually or automatically.

The photographing control section 112 has a function for controlling various photographing operations in a selected photographing mode.

For example, in long time exposure image capturing, when detecting the fully-pressed state of the release button 11, the photographing control section 112 divides the exposure time TE into predetermined time periods, and controls the exposure to the image sensor C10 to be dividedly performed a plurality of times. The details will be described later.

When performing long time exposure image capturing, the amplification ratio calculation section 113 calculates the amplification ratio AP for amplifying the accumulated image signal in order to compensate for an exposure of exposure time insufficient for the exposure time TE.

Specifically, the amplification ratio calculation section 113 calculates the amplification ratio AP which enables generation of an image having the same output level (brightness) as that of an image obtained by long time exposure image capturing (this image is also called "the last image") by multiplying the accumulated image signal by the amplification ratio AP. The amplification ratio AP is represented by Formula (1) using the set exposure time TE and an accumulated time DT of exposures having been performed (the accumulated time is also called "accumulated exposure time").

[Formula 1]

$$AP=TE/DT \quad (1)$$

In this way, the amplification ratio AP is represented by a proportion of the exposure time TE to the accumulated exposure time DT.

The noise amount calculation section 114 calculates the amount of noise SA included in the amplified image signal. The details will be described later.

The display control section 115 controls display contents on a display section such as the monitor 12. For example, the display control section 115 displays an image on the basis of the image signal stored in the image memory in the photographing mode. On the other hand, in the reproducing mode, the display control section 115 displays a captured image read from the recording device 105 on the monitor 12.

<1-3. Long Time Exposure Image Capturing>

Figure 6:
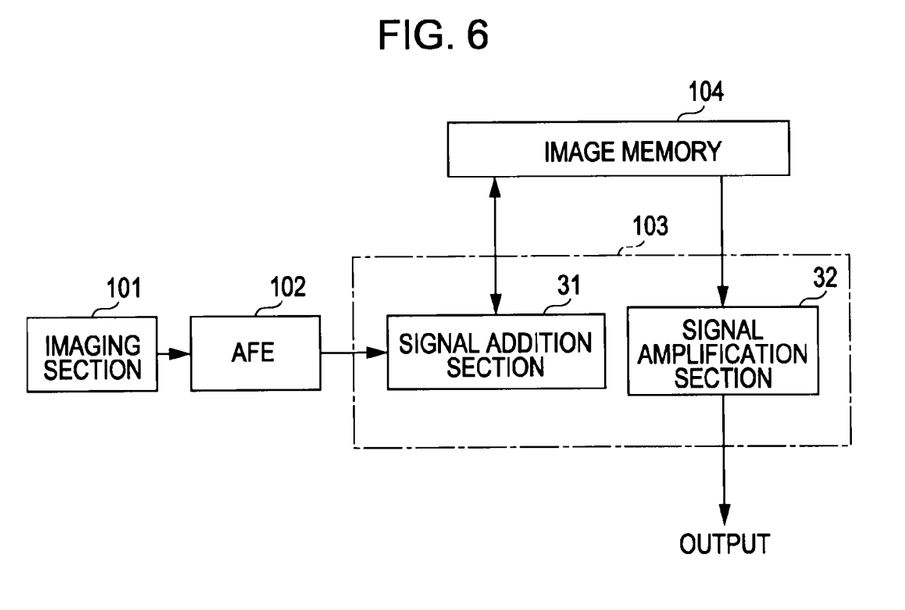
FIG. 6 is a diagram showing a flow of an image signal in long time exposure image capturing.

Here, long time exposure image capturing in which exposure is performed for a time longer than a basic exposure time BE will be described in detail. FIG. 6 is a diagram showing a flow of an image signal in long time exposure image capturing.

In long time exposure image capturing of the image capturing apparatus 1, exposure to the image sensor C10 is divided into a plurality of times and dividedly performed, and the image signals obtained by each exposure are added.

Specifically, as shown in FIG. 6, the image signals generated in each exposure by the imaging section 101 and the AFE 102 are sequentially inputted into the signal addition section 31 in accordance with timing pulses of the AFE. The signal addition section 31 reads the accumulated image signal accumulated in the image memory 104, and adds newly inputted image signal to the accumulated image signal. The image signal newly generated by the addition processing is overwritten and stored in the image memory 104 as accumulated image data. An image signal obtained by the first exposure in long time exposure image capturing is stored in the image memory 104 as accumulated image data without change.

The signal amplification section 32 reads current accumulated image data from the image memory 104, amplifies the accumulated image signal by the amplification ratio AP, and outputs the amplified image signal. The outputted amplified image signal is, for example, displayed on the monitor 12 as a halfway exposed captured image.

The display on the monitor 12 is updated every time the divided exposure ends. Thereby, the photographer can visually check the image being updated as time passes, and determine a timing to end long time exposure image capturing.

As described above, the amplification of the accumulated image signal is performed by using the amplification ratio AP corresponding to the exposure time TE, and an image having the same output level as the last image obtained after the end of the long time exposure is generated by the amplification.

Specifically, since the accumulated exposure time DT is short in an early stage of exposure, the amplification ratio AP calculated by the above Formula (1) is a large value. Therefore, the accumulated image signal in an early stage of exposure is largely amplified by the amplification ratio AP, and an image having the same output level as that of the last image is generated.

On the other hand, when the exposure proceeds and the accumulated exposure time DT becomes long, the amplification ratio AP is set to a small value by the above Formula (1). Therefore, the accumulated image signal in a later stage of exposure is slightly amplified by the amplification ratio AP, and an image having the same output level as that of the last image is generated. In this way, by using the amplification ratio AP which becomes small when the accumulated exposure time DT becomes long, the output level of the captured image displayed on the monitor 12 can be the same level as that of the last image, even when a signal level of the accumulated image signal becomes high as the accumulated exposure time DT passes.

In the amplification processing, since the accumulated image signal in an early stage of exposure is amplified by a relatively large amplification ratio AP, noise included in the accumulated image signal is also largely amplified, so that the amplified image signal having been amplified includes a large amount of noise. On the other hand, since the accumulated image signal is amplified by a relatively small amplification ratio AP when the exposure proceeds, noise included in the amplified image signal becomes small. In other words, as the exposure proceeds, the amount of noise included in the amplified image signal decreases.

The change of noise corresponding to the change of the amplification ratio AP is the same phenomenon as the change of noise corresponding to the change of sensitivity (imaging sensitivity) of the image sensor. Specifically, a processing for obtaining the amplified image signal by changing the amplification ratio AP in accordance with the exposure-time TE is the same as a processing for performing a photographing operation by changing the imaging sensitivity. In other words, obtaining the amplified image signal by decreasing the amplification ratio AP as the exposure proceeds is the same as obtaining a captured image by performing a photographing operation as sensitivity condition is changed from high sensitivity to low sensitivity.

Therefore, if long time exposure image capturing is ended when a photographer visually checks an image displayed on the monitor 12 on the basis of the amplified image signal and determines that the amount of noise becomes smaller than or equal to an acceptable amount, the photographing operation is assumed to have been performed with optimal sensitivity. As a result, in the image capturing apparatus 1, the photographer can obtain an image equivalent to an image photographed with optimal sensitivity without setting sensitivity before the photographing operation.

The photographer can instruct the end of exposure by re-pressing the release button 11. When the fully-pressed state of the release button 11 is detected during a photographing operation, an exposure end operation is performed.

After the exposure, the accumulated image signal stored in the image memory 104 at the end of exposure is read by the signal amplification section 32, and amplified by the amplification ratio AP at the end of exposure, so that the amplified image signal is generated. After a predetermined image processing is performed on the amplified image signal as a long time exposure image (also called "long exposure image") obtained by long time exposure image capturing, the amplified image signal is stored in the recording device 105.

<1-4. Information Service to Photographer>

Figure 7:
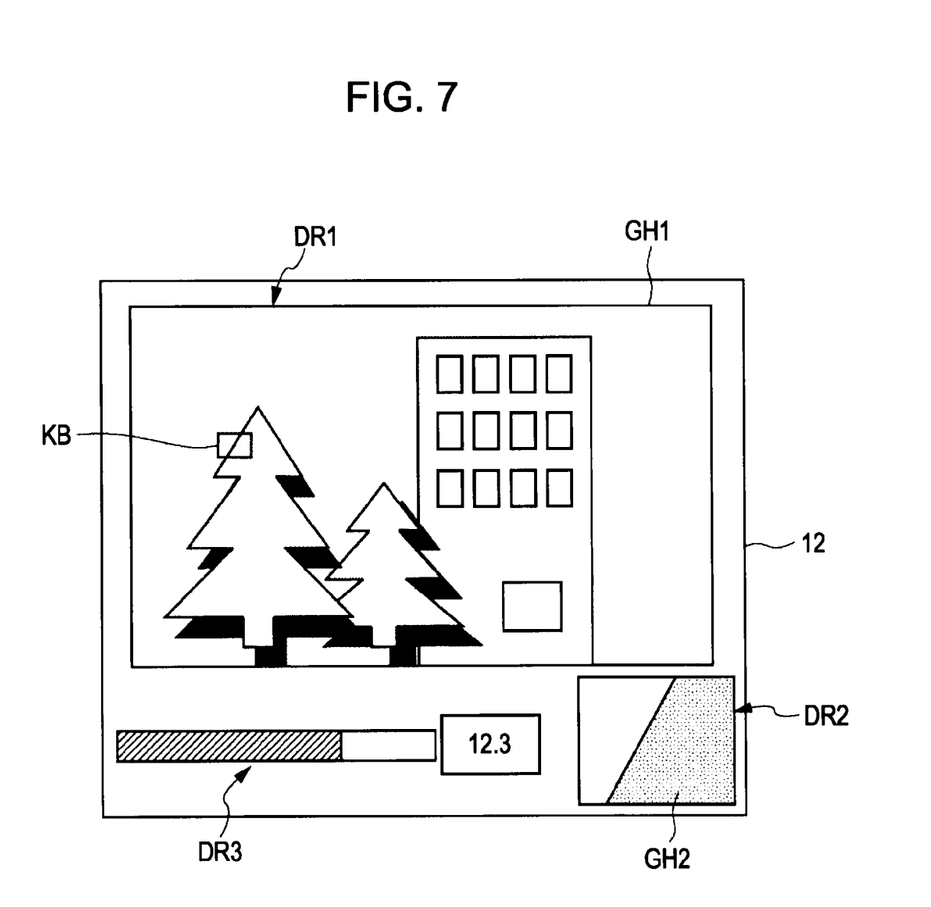
FIG. 7 is a diagram showing a display mode of a monitor in long time exposure image capturing.

Next, an information service to a photographer performed during long time exposure image capturing will be described. FIG. 7 is a diagram showing a display mode of the monitor 12 in long time exposure image capturing.

As shown in FIG. 7, in long time exposure image capturing, a halfway exposed captured image GH1, an enlarged image GH2 where a part of the captured image GH1 is enlarged, and noise data GD are displayed on the monitor 12.

Specifically, the halfway exposed captured image GH1 is displayed in an image display area DR1 in a form where an entire image can be visually checked.

The enlarged image GH2 is displayed in an enlarged image display area DR2. A portion to be enlarged in the captured image GH1 is specified by a button operation in which a frame display KB displaying the portion to be enlarged is moved using the direction selection key 17 and the like. The enlarged image GH2 is displayed to be a one-pixel-to-one-pixel display in which one pixel of display element on the monitor 12 corresponds to one pixel of the amplified image signal which is to be displayed. Or, the enlarged image GH2 is displayed several times larger than the above.

The display which enlarges a part of image to the one-pixel-to-one-pixel display and the like makes it easy to visually check the noise in the captured image.

The halfway exposed captured image GH1 and the enlarged image GH2 are updated every time the divided exposure ends.

The noise data GD is information related to the amount of noise SA in a predetermined portion in the halfway exposed captured image GH1, and displayed in a noise display area DR3. In the noise display area DR3, a graph for displaying a value indicating the amount of noise SA and an achievement level (attainment level) of a current noise amount SA to a predetermined reference noise amount BA is displayed as noise data GD.

The amount of noise SA can be obtained by, for example, quantitatively calculating variation among pixel values of pixels in a homogeneous portion of the subject where no variation is detected in output of the image sensor C10 when there is no noise. As an indicator which quantitatively shows the variation among pixel values, for example, a standard deviation is used.

Specifically, when an area where pixel values of each pixel are the same (equal) if there is no noise is specified as a noise measurement area in the captured image GH1, the amount of noise SA is represented by Formula (2) using an average pixel value HV of pixels included in the noise measurement area, a pixel value PVi of $i^{th}$ pixel included in the noise measurement area, and the number of pixels N included in the noise measurement area.

[Formula 2]

$$SA = \sqrt{\frac{1}{N}\sum_{i=1}^{N}(PVi-HV)^2} \quad (2)$$

The noise measurement area is specified by a button operation using the direction selection key 17 and the like, and an area different from the portion to be enlarged and displayed in the enlarged image display area DR2 can be specified.

If there is no area where pixel values are the same in the captured image, a predetermined area included in the optical black area BR provided in an upper edge portion of the image sensor C10 may be specified as the noise measurement area. Since the optical black area BR is an area which does not receive the subject light, the predetermined area included in the optical black area BR is an area in which no variation occurs among pixel outputs if there is no noise. Therefore, when the predetermined area is specified as the noise measurement area, the amount of noise SA can be calculated more precisely.

<1-5. Operation>

Figure 8:
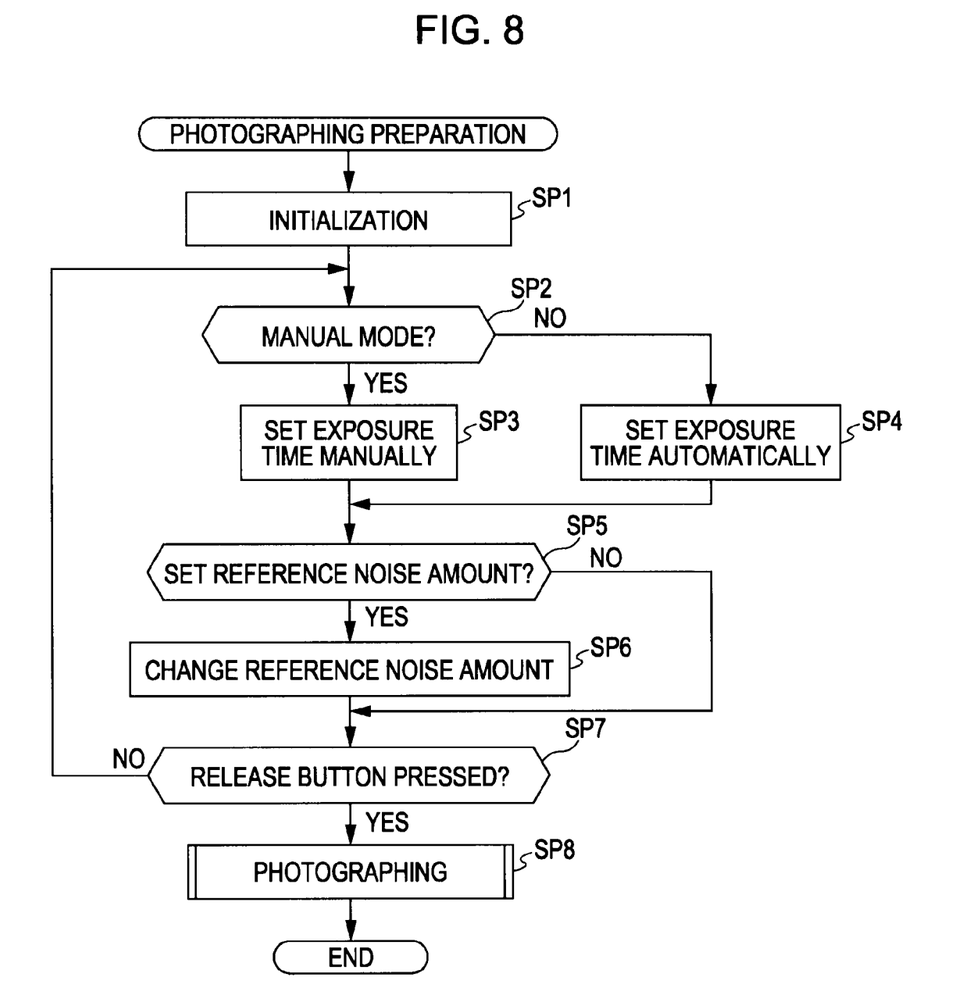
FIG. 8 is a flowchart showing a photographing operation of the image capturing apparatus.
Figure 9:
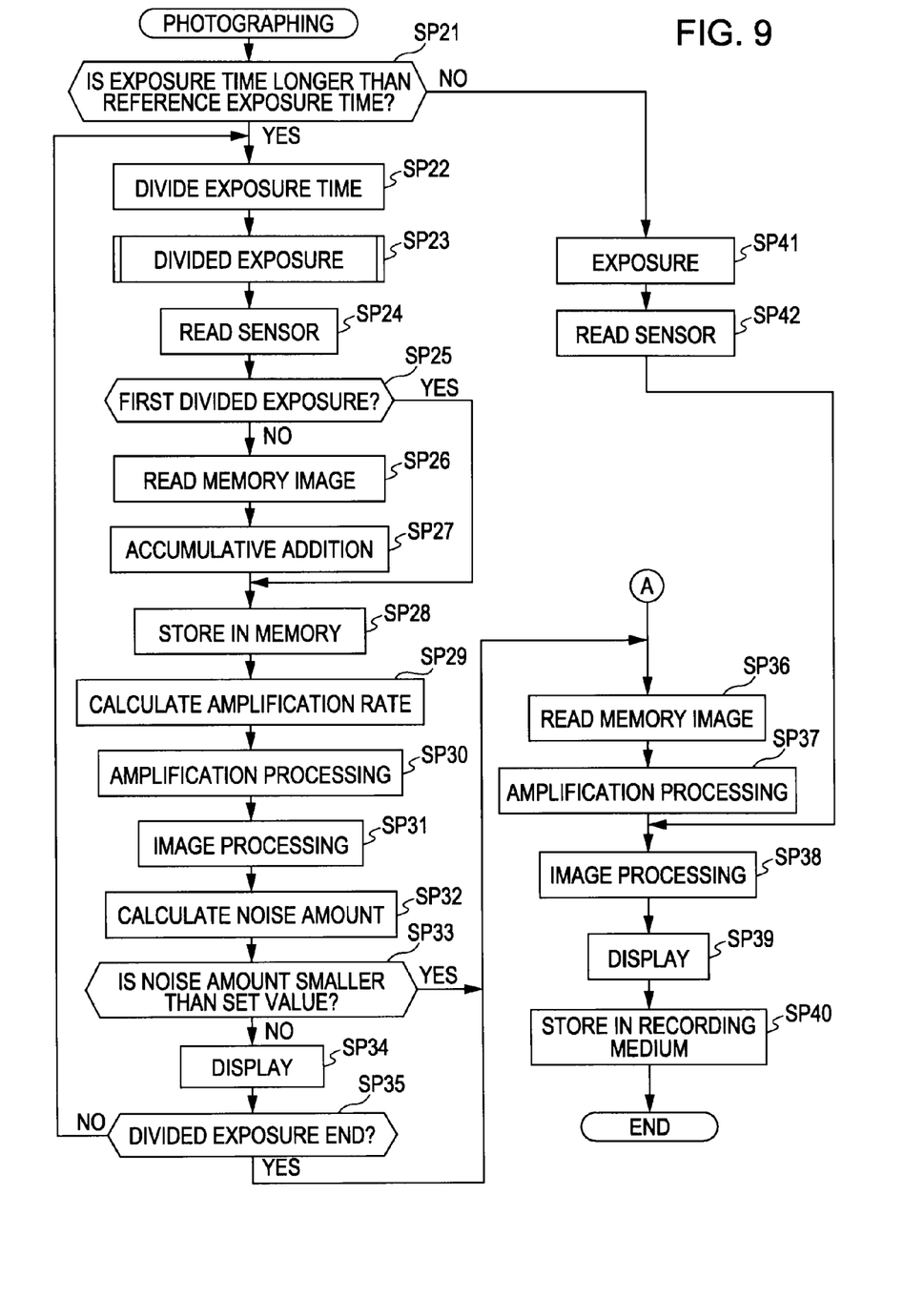
FIG. 9 is a flowchart showing details of the photographing operation.

Next, a photographing operation of the image capturing apparatus 1 will be described. FIG. 8 is a flowchart showing the photographing operation of the image capturing apparatus 1. FIG. 9 is a flowchart showing details of the photographing operation.

As shown in FIG. 8, first, in step SP1, when the photographing mode is detected, an initialization of the image capturing apparatus 1 such as an initialization of the image sensor C10, an initialization of variables used in calculations, and the like is performed.

In step SP2, a status of the mode dial 5 is detected, and whether the manual mode is set or not is determined.

When the manual mode is set, the process moves to step SP3. In step SP3, the exposure time TE is set by an operation of the control value setting dial 6 by the user. On the other hand, when the manual mode is not set, the process moves to step SP4. In step SP4, the exposure time TE is automatically set to obtain an appropriate exposure by the exposure control section 111.

In step SP5, whether or not the reference noise amount BA is set by an operation of the control value setting dial 6 is determined.

When the reference noise amount BA is set, the process moves to step SP6, and a value of reference noise amount BA stored in the image capturing apparatus 1 is changed according to the operation of the control value setting dial 6. On the other hand, when the reference noise amount BA is not set, the process moves to step SP7.

In step SP7, whether to start a photographing operation is determined on the basis of a pressing condition of the release button 11. Specifically, when the fully-pressed state (S2 state) of the release button 11 is not detected, the process moves to step SP2, and processings from step SP2 to step SP7 are repeatedly performed until the fully-pressed state of the release button 11 is detected. On the other hand, when the fully-pressed state (S2 state) of the release button 11 is detected, the process moves to step SP8.

In step SP8, the photographing operation is started. Specifically, the subject light is emitted to the image sensor C10, and an image signal is generated at each pixel constituting the image sensor C10.

Here, the photographing operation performed in step SP8 will be described in detail. FIG. 9 is a flowchart of the photographing operation.

When the fully-pressed state of the release button 11 is detected (step SP7), the photographing operation shown in FIG. 9 is started.

In step SP21, whether or not the exposure time TE set by the photographing control section 112 is longer than the reference exposure time BE is determined.

When the exposure time TE is shorter than the reference exposure time BE, the process moves to step SP41, and a photographing operation with a normal exposure is performed. Specifically, exposure is performed for the set exposure time TE (step SP41), and obtained image signal is read from the image sensor C10 (step SP42), so that the captured image is obtained. Thereafter, the process moves to step SP38.

On the other hand, when the exposure time TE is longer than the reference exposure time BE, the process moves to step SP22, and a photographing operation with divided exposure is performed in a series of processings of step SP22 and later steps.

Hereinafter, the photographing operation with divided exposure, in which the reference exposure time BE is set to one minute, will be described.

In step SP22, a division processing of the exposure time TE is performed. Specifically, the exposure time TE is divided by the reference exposure time BE, and the number of times of performing the divided exposure (the number of exposure times) is determined. If a remainder is left when the exposure time TE is divided by the reference exposure time BE, an exposure corresponding to the remainder is performed when the last exposure is performed. Specifically, an exposure time corresponding to the remainder is added to the exposure time of the last exposure of the divided exposure.

In step SP23, one of the divided exposures is performed. The details will be described later.

In step SP24, an image signal obtained by the image sensor C10 in one of the divided exposures is read.

In step SP25, whether the divided exposure performed in step SP23 is the first divided exposure or not is determined.

If it is the first divided exposure, the process skips step SP26 and step SP27, and proceeds to step SP28, where the image signal is stored in the image memory 104.

On the other hand, when it is not the first divided exposure, the process moves to step SP26. In step SP26, the accumulated image signal stored in the image memory 104 is read.

In step SP27, an addition processing in which the image signal obtained by the divided exposure is added to the accumulated image signal is performed by the signal addition section 31.

In step SP28, the accumulated image signal newly generated by the addition processing is overwritten and stored in the image memory 104.

In step SP29, the amplification ratio AP for amplifying the accumulated image signal is calculated by the amplification ratio calculation section 113.

In step SP30, the accumulated image signal is read from the image memory 104, and an amplification processing of the accumulated image signal using the amplification ratio AP is performed by the signal amplification section 32.

In step SP31, a predetermined image processing such as gamma correction is performed on the amplified image signal by the image processing section 103.

In step SP32, the amount of noise SA included in the amplified image signal (halfway exposed captured image GH1) is calculated by the noise amount calculation section 114.

In step SP33, the amount of noise SA related to the halfway exposed captured image GH1 and the predetermined reference noise amount BA are compared, and whether or not the amount of noise SA is smaller than or equal to a predetermined set value (here, the reference noise amount BA) is determined.

When the amount of noise SA is smaller than or equal to the reference noise amount BA, the process moves to step SP36.

In this way, in the image capturing apparatus 1, when the amount of noise SA calculated from the halfway exposed captured image GH1 is smaller than or equal to the reference noise amount BA, the exposure operation is automatically ended.

On the other hand, when the amount of noise SA is not smaller than or equal to (is greater than) the reference noise amount BA, the process moves to step SP34.

In step SP34, information related to the amplified image signal (specifically, the halfway exposed captured image GH1, the amount of noise SA, and the like) is displayed on the monitor 12 by the display control section 115.

In step SP35, whether the divided exposures corresponding to the number of exposure times have been performed or not is determined.

Specifically, when it is determined that the divided exposures corresponding to the number of exposure times have not yet been performed, the process moves to step SP22, and the processings from step SP22 to step SP35 are repeatedly performed.

On the other hand, when the divided exposures corresponding to the number of exposure times have been performed, the process moves to step SP36.

In step SP36, the latest accumulated image signal stored in the image memory 104 at the end of exposure is read.

In step SP37, an amplification processing of the accumulated image signal using the amplification ratio AP at the end of exposure is performed by the signal amplification section 32, so that a long time exposure image is generated as the captured image.

Thereafter, the same image processing as that of step SP31 is performed on the captured image (step SP38), and the captured image after the image processing is displayed on the monitor 12 (step SP39).

In step SP40, the captured image is stored in the recording device 105.

As described above, in this photographing operation, exposure is dividedly performed in long time exposure image capturing, and image signals obtained in each exposure are added to generate an added image signal. The added image signal is amplified by the amplification ratio AP calculated on the basis of the accumulated exposure time DT, so that the long time exposure image is obtained as the captured image.

Figure 10:
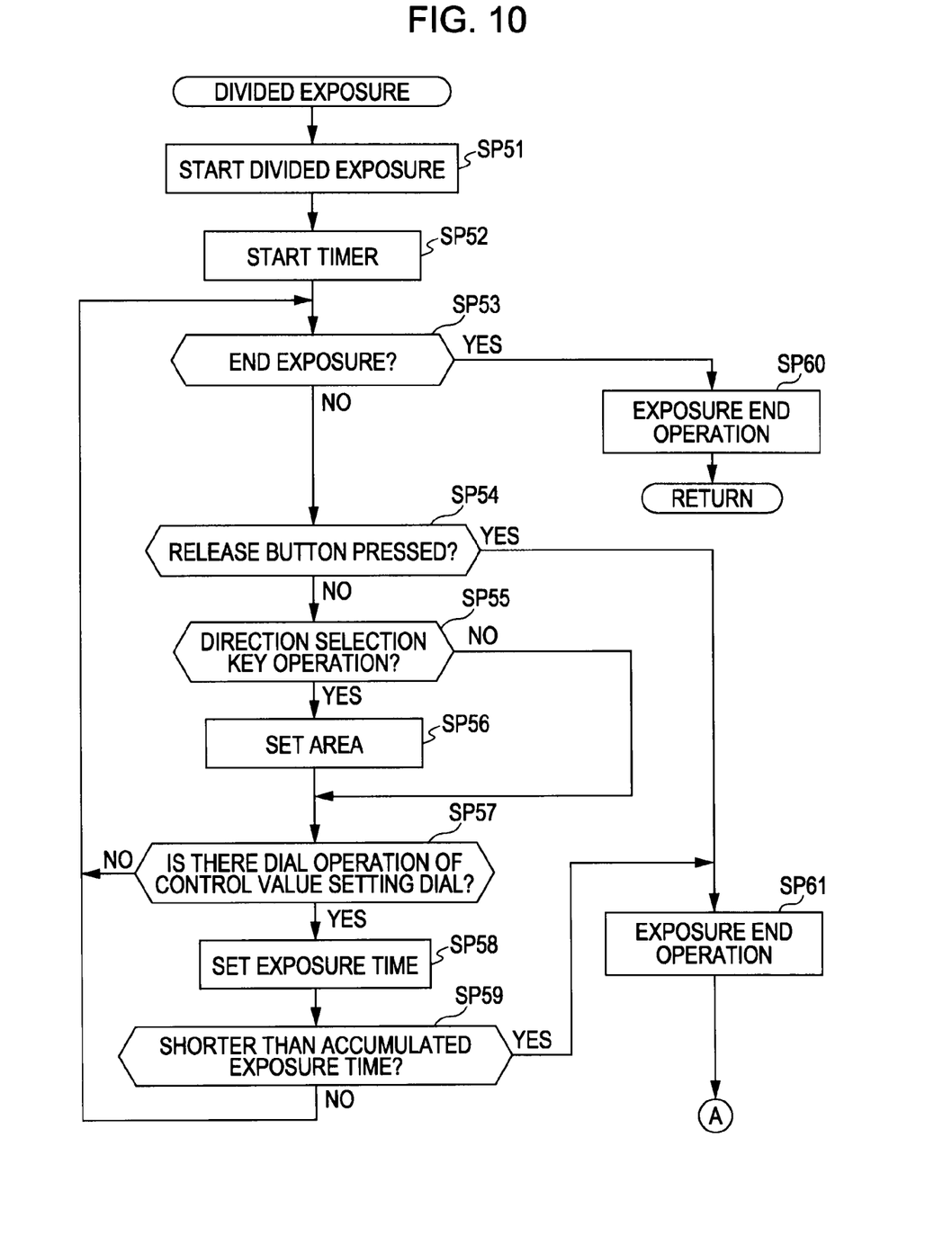
FIG. 10 is a flowchart showing details of a divided exposure processing.

Hereinafter, the divided exposure operation performed in step SP23 will be described in detail. FIG. 10 is a flowchart of the divided exposure operation.

As shown in FIG. 10, first, in step SP51, a control signal for starting exposure is transmitted to the image sensor C10 by the photographing control section 112, so that the exposure is started.

In step SP52, a timer for counting an exposure time is started at the same time the exposure is started.

In step SP53, a time measured by the timer is checked, and whether an exposure of the reference exposure time BE (here, one minute) has ended or not is determined.

When the time measured by the timer has passed (is longer than or equal to) the reference exposure time BE, the process moves to step SP60, and an end operation of the divided exposure is performed. Specifically, in step SP60, a control signal for ending exposure is transmitted to the image sensor C10, and the timer is reset. When the divided exposure is ended, the process moves to step SP24 (FIG. 9).

On the other hand, when the time measured by the timer is shorter than the reference exposure time BE, the process moves to step SP54.

In step SP54, whether the release button 11 is pressed or not is determined.

When the fully-pressed state of the release button 11 is detected (step SP7), the process moves to step SP61, and an end operation of the divided exposure is performed in the same way as step SP60. After the end operation of the divided exposure is performed, the process moves to step SP36 (FIG. 9).

In this way, in the image capturing apparatus 1, re-pressing of the release button is an operation for instructing to end the exposure operation, so that the user can also end the exposure operation by re-pressing the release button 11.

On the other hand, when the fully-pressed state of the release button 11 is not detected, the process moves to step SP55.

In step SP55, whether the direction selection key 17 is operated or not is determined. When the direction selection key 17 is operated, the process moves to step SP56, and in step SP56, an area setting (specifically, specifying an area to be enlarged and a noise measurement area) is performed.

Specifically, when an operation of the direction selection key 17 is detected, first, a portion to be enlarged which is displayed in the enlarged image display area DR2 is specified. The portion to be enlarged is selected by the user operation using the direction selection key 17, and the portion to be enlarged is decided by the decision button 17a. Thereafter, the noise measurement area is specified.

The noise measurement area is also specified by the operation of the direction selection key 17 and the decision button 17a in the same way as the case in which the portion to be enlarged is specified. When specifying a predetermined area included in the optical black area BR as the noise measurement area, a frame display indicating the noise measurement area is moved out of the image display area DR1 and the decision button is pressed.

As described above, in step SP56, the area setting is performed by the user.

On the other hand, when an operation of the direction selection key 17 is not detected, the process skips step SP56 and moves to step SP57.

In step SP57, whether a dial operation of the control value setting dial 6 is performed or not is determined.

When a dial operation of the control value setting dial 6 is not detected, the process returns to step SP53, and when a dial operation of the control value setting dial 6 is detected, the process moves to step SP58.

In step SP58, the exposure time TE is changed corresponding to the dial operation of the control value setting dial 6.

In step SP59, whether the changed exposure time is shorter than the accumulated exposure time DT or not is determined.

When the changed exposure time is shorter than the accumulated exposure time DT, the process moves to step SP61, and an exposure end operation is performed. Thereafter the process moves to step SP36 (FIG. 9).

On the other hand, when the changed exposure time is longer than the accumulated exposure time DT, the process returns to SP53.

In this way, the user can check visually the image based on the amplified image signal, and change the exposure time when determining that the image is too bright or too dark. When the exposure time is changed, an exposure end operation or re-setting of the number of exposure times (step SP22) is performed by the photographing control section 112.

As described above, in the image capturing apparatus 1, the exposure to the image sensor C10 is divided into a plurality of times and dividedly performed in accordance with the predetermined exposure time TE, and the image signals obtained by each exposure are sequentially added to generate the added image signal. The added image signal is amplified using an amplification ratio for compensating for an exposure insufficient for the exposure time TE, and the information related to the amplified image signal is displayed on the monitor 12. In this way, since the user can find timing to end the exposure while referring to the information related to the amplified image signal, the user can perform a photographing operation in which the amount of noise in addition to the exposure time is taken into account.

In the image capturing apparatus 1, the amount of noise SA included in the amplified image signal is calculated by the noise calculation section 114, and the photographing operation is automatically ended depending on the amount of noise SA. In this way, a photographing operation in which the amount of noise SA is taken into account can be performed.

2. Modified Examples

Although the embodiment of the present invention has been described so far, the present invention is not limited to the embodiment described above.

For example, the exposure operation is automatically ended depending on the amount of noise SA in the above embodiment, the present invention is not limited to this.

Specifically, the function for ending the exposure operation in accordance with the amount of noise SA may be turned off. Specifically, the off state of the function may be set to a position next to a value (0.1) which is a minimum value settable by the dial operation of the control value setting dial 6 as the reference noise amount BA. When the off state of the function is set by the dial operation of the control value setting dial 6, the reference noise amount BA stored in the image capturing apparatus 1 is set to a value which is difficult to achieve (for example, minus 100) so that the automatic ending function of the exposure operation is not performed.

In the above embodiment, although the brightness information used for determining the exposure value is obtained from the image sensor C10, the present invention is not limited to this.

Specifically, an additional photometric sensor may be provided to the image capturing apparatus 1 so that brightness information of the subject is obtained from the photometric sensor.

In the above embodiment, although the area setting processing (step SP56) is performed after the exposure, the present invention is not limited to this.

Specifically, when a live view function is included and the subject image can be visually checked on the monitor 12 before the photographing operation, the area may be specified in a photographing preparation operation before the photographing operation.

In the above embodiment, although the case in which the information related to the halfway exposed captured image GH1 is typically displayed on the monitor 12 in long time exposure image capturing is illustrated, the present invention is not limited to this.

Specifically, it is possible that the monitor 12 is turned off during long time exposure image capturing, and the monitor 12 is turned on when a user operation (for example, button operation) is detected to display the halfway exposed captured image GH1 and the like. In this way, power consumption can be controlled.

In the above embodiment, although a form in which the operation member provided on the image capturing apparatus 1 is directly operated is illustrated, the present invention is not limited to this, and the image capturing apparatus 1 may be operated by using a wired or wireless remote operation member. In this way, an occurrence of misalignment due to the operation to the member during exposure can be prevented.

The present application contains subject matter related to that disclosed in Japanese Priority Patent Application JP 2008-243980 filed in the Japan Patent Office on Sep. 24, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
   an image sensor for generating an image signal related to a subject image;
   photographing control means for performing a photographing operation in which an exposure of the image sensor is divided into a plurality of exposures which divide a total exposure time;
   addition means for adding sequentially the image signals obtained at each exposure in the photographing operation;
   amplification ratio calculation means for calculating an amplification ratio of the image signal added by the addition means based on a current accumulated exposure time which is less than the total exposure time;
   amplification means for amplifying the image signal added by the addition means by using the amplification ratio to compensate for insufficient exposure for the total exposure time; and
   display control means for displaying information related to the image signal amplified by the amplification means on a display section, the display control means displaying noise information indicating a current amount of noise accumulated in the image signal, the noise information including a noise display graph displaying a value of the current amount of noise;
   wherein the photographing control means ends the photographing operation when detecting an end instruction operation performed by a user, and determines that the image signal amplified by the amplification means is a captured image obtained by performing the photographing operation with the total exposure time.

2. The image capturing apparatus according to claim 1, wherein the amplification ratio is equal to the total exposure time divided by the current accumulated exposure time accumulated by each exposure.

3. The image capturing apparatus according to claim 2, wherein the display control means enlarges a part of the subject image based on the image signal amplified by the amplification means and displays the enlarged image.

4. The image capturing apparatus according to claim 3, further comprising:
   noise amount calculation means for calculating the current amount of noise included in the image signal amplified by the amplification means.

5. The image capturing apparatus according to claim 1, further comprising:
   changing means for changing the total exposure time;
   wherein the photographing control means performs the photographing operation in accordance with the total exposure time which has been changed by the changing means.

6. The image capturing apparatus according to claim 1, further comprising:
   memory means; wherein the photographing control means stores the image signal amplified by the amplification means in the memory means when detecting an end instruction operation performed by a user.

7. An image capturing apparatus comprising:
   an image sensor for generating an image signal related to a subject image;
   photographing control means for performing a photographing operation in which an exposure of the image sensor is divided into a plurality of exposures which divide a total exposure time;
   addition means for adding sequentially the image signals obtained at each exposure in the photographing operation;
   amplification ratio calculation means for calculating an amplification ratio of the image signal added by the addition means based on a current accumulated exposure time which is less than the total exposure time;
   amplification means for amplifying the image signal added by the addition means by using the amplification ratio to compensate for insufficient exposure for the total exposure time;
   noise amount calculation means for calculating an amount of noise included in the image signal amplified by the amplification means; and
   display control means for displaying an indication of the amount of noise accumulated in the image signal;
   wherein the photographing control means ends the photographing operation in accordance with the amount of noise, and determines that the image signal amplified by the amplification means is a captured image obtained by performing the photographing operation with the total exposure time.

8. The image capturing apparatus according to claim 7, wherein the photographing control means ends the photographing operation when the amount of noise is smaller than a predetermined reference noise amount, and determines that the image signal amplified by the amplification means is the captured image.

9. The image capturing apparatus according to claim 7, wherein the image sensor includes predetermined pixels to which subject light is not radiated in the exposure, and noise calculation means calculates the amount of noise using an output signal from the predetermined pixels.

10. A control method of an image capturing apparatus, the method comprising:
- performing a photographing operation in which an exposure of the image sensor is divided into a plurality of exposures which divide a total exposure time;
- adding sequentially the image signals obtained at each exposure in the photographing operation;
- calculating an amplification ratio of the image signal added in the adding based on a current accumulated exposure time which is less than the total exposure time;
- amplifying the image signal added in the adding by using the amplification ratio to compensate for insufficient exposure for the total exposure time; and
- displaying information related to the image signal amplified in the amplifying on a display section, the displaying including displaying noise information indicating a current amount of noise accumulated in the image signal, the noise information including a noise display graph displaying a value of the current amount of noise;
- wherein, in the performing, the photographing operation is ended when an end instruction operation performed by a user is detected, and the image signal amplified in the amplifying is determined to be a captured image obtained by performing the photographing operation with the total exposure time.

11. A non-transitory computer readable medium encoded with a program causing a computer included in an image capturing apparatus to execute a method comprising:
- performing a photographing operation in which an exposure of the image sensor is divided into a plurality of exposures which divide a total exposure time;
- adding sequentially the image signals obtained at each exposure in the photographing operation;
- calculating an amplification ratio of the image signal added in the adding based on a current accumulated exposure time which is less than the total exposure time;
- amplifying the image signal added in the adding by using the amplification ratio to compensate for insufficient exposure for the total exposure time; and
- displaying information related to the image signal amplified in the amplifying on a display section, the displaying including displaying noise information indicating a current amount of noise accumulated in the image signal, the noise information including a noise display graph displaying a value of the current amount of noise;
- wherein, in the performing, the photographing operation is ended when an end instruction operation performed by a user is detected, and the image signal amplified in the amplifying is determined to be a captured image obtained by performing the photographing operation with the total exposure time.

12. A control method of an image capturing apparatus, the method comprising:
- performing a photographing operation in which an exposure of the image sensor is divided into a plurality of exposures which divide a total exposure time;
- adding sequentially the image signals obtained at each exposure in the photographing operation;
- calculating an amplification ratio of the image signal added in the adding based on a current accumulated exposure time which is less than the total exposure time;
- amplifying the image signal added in the adding by using the amplification ratio to compensate for insufficient exposure for the total exposure time;
- calculating an amount of noise included in the image signal amplified in the amplifying; and
- displaying noise information indicating the amount of noise accumulated in the image signal;
- wherein, in the performing, the photographing operation is ended depending on the amount of noise, and the image signal amplified in the amplifying is determined to be a captured image obtained by performing the photographing operation with the total exposure time.

13. A non-transitory computer readable medium encoded with a program causing a computer included in an image capturing apparatus to execute a method comprising:
- performing a photographing operation in which an exposure of the image sensor is divided into a plurality of exposures which divide a total exposure time;
- adding sequentially the image signals obtained at each exposure in the photographing operation;
- calculating an amplification ratio of the image signal added in the adding based on a current accumulated exposure time which is less than the total exposure time;
- amplifying the image signal added in the adding by using the amplification ratio to compensate for insufficient exposure for the total exposure time;
- calculating an amount of noise included in the image signal amplified in the amplifying; and
- displaying noise information indicating the amount of noise accumulated in the image signal;
- wherein, in the performing, the photographing operation is ended depending on the amount of noise, and the image signal amplified in the amplifying is determined to be a captured image obtained by performing the photographing operation with the total exposure time.

14. An image capturing apparatus comprising:
- an image sensor configured to generate an image signal related to a subject image;
- a photographing control section configured to perform a photographing operation in which an exposure of the image sensor is divided into a plurality of exposures which divide a total exposure time;
- an addition section configured to add sequentially the image signals obtained at each exposure in the photographing operation;
- an amplification ratio calculation section configured to calculate an amplification ratio of the image signal added by the addition section based on a current accumulated exposure time which is less than the total exposure time;
- an amplification section configured to amplify the image signal added by the addition section by using the amplification ratio to compensate for insufficient exposure for the total exposure time; and
- a display control section configured to display information related to the image signal amplified by the amplification section on a display section, the display control section displaying noise information indicating a current amount of noise accumulated in the image signal, the noise information including a noise display graph displaying a value of the current amount of noise;
- wherein the photographing control section ends the photographing operation when detecting an end instruction operation performed by a user, and determines that the image signal amplified by the amplification section is a captured image obtained by performing the photographing operation with the total exposure time.

15. An image capturing apparatus comprising:
- an image sensor configured to generate an image signal related to a subject image;
- a photographing control section configured to perform a photographing operation in which an exposure of the image sensor is divided into a plurality of exposures which divide a total exposure time;

an amplification ratio calculation section configured to calculate an amplification ratio of the image signal added by the addition section based on a current accumulated exposure time which is less than the total exposure time;

an amplification section configured to amplify the image signal added by the addition section by using the amplification ratio to compensate for insufficient exposure for the total exposure time; and a noise amount calculation section configured to calculate an amount of noise included in the image signal amplified by the amplification section; and a display control section configured to display noise information indicating the amount of noise accumulated in the image signal;

wherein the photographing control section ends the photographing operation in accordance with the amount of noise, and determines that the image signal amplified by the amplification section is a captured image obtained by performing the photographing operation with the total exposure time.

* * * * *